United States Patent
Challa et al.

(10) Patent No.: US 9,294,141 B2
(45) Date of Patent: Mar. 22, 2016

(54) SYSTEM AND METHODS FOR IMPROVING PAGE DECODE PERFORMANCE DURING READING OF SYSTEM INFORMATION ON A MULTI-SIM WIRELESS COMMUNICATION DEVICE

(71) Applicant: QUALCOMM Incorporated, San Diego, CA (US)

(72) Inventors: Nikhil Challa, San Diego, CA (US); Deepti Mani, San Diego, CA (US); Hemanth Kumar Rayapati, San Diego, CA (US); Rakesh Surapaneni, Atlanta, GA (US); Suresh Sanka, Hyderabad (IN); Sathish Krishnamoorthy, Hyderabad (IN); Subbarayudu Mutya, Hyderabad (IN); Venkata Appala Naidu Babbadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/505,037

(22) Filed: Oct. 2, 2014

(65) Prior Publication Data
US 2015/0057046 A1 Feb. 26, 2015

Related U.S. Application Data

(63) Continuation-in-part of application No. 13/831,761, filed on Mar. 15, 2013, now Pat. No. 8,958,847.

(60) Provisional application No. 61/645,737, filed on May 11, 2012.

(51) Int. Cl.
*H04W 4/16* (2009.01)
*H04B 1/3816* (2015.01)
(Continued)

(52) U.S. Cl.
CPC ............. *H04B 1/3816* (2013.01); *H04W 4/001* (2013.01); *H04W 4/16* (2013.01); *H04W 48/10* (2013.01);
(Continued)

(58) Field of Classification Search
None
See application file for complete search history.

(56) References Cited

U.S. PATENT DOCUMENTS 8,134,977 B2  3/2012 Parekh et al.
8,244,301 B2  8/2012 Shi
(Continued)

FOREIGN PATENT DOCUMENTS

CN  101203005 A  6/2008
CN  101719788 A  6/2010
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 10)", 3GPP Standard; 3GPP TS 36.331, 3rdGeneration Partnership Project (3GPP), Mobile Competence Centre ; 650, Route Deslucioles ; F-06921 Sophia-Antipolis Cedex; France, vol. RAN WG2, No. V10.5.0, Mar. 13, 2012, pp. 1-302, XP050580020, [retrieved on Mar. 13, 2012] 5.3.11.2; 5.3.11.3.
(Continued)

*Primary Examiner* — Diane Mizrahi
(74) *Attorney, Agent, or Firm* — The Marbury Law Group, PLLC

(57) ABSTRACT

Methods and devices are disclosed for enabling improved performance for page decodes on a SIM of a multi-SIM wireless communication device in which a shared radio frequency (RF) resource is used to read system information for a different SIM. After determining that a first SIM is using the shared RF resource to decode SIBs, the wireless device may receive information about an upcoming page decode time for monitoring a paging channel associated with the second SIM. The wireless device may obtain system information block (SIB) scheduling information associated with the first SIM, and may create a RF resource release gap during the system information read period based on the SIB scheduling information and the upcoming page decode time. Control of the RF resource may be released from the modem stack associated within the first SIM, and gained by a modem stack associated with the second SIM during the RF resource release gap.

30 Claims, 12 Drawing Sheets

(51) Int. Cl.
*H04W 48/10* (2009.01)
*H04W 68/00* (2009.01)
*H04W 4/00* (2009.01)
*H04W 48/12* (2009.01)
*H04W 68/02* (2009.01)
*H04W 68/12* (2009.01)
*H04W 88/06* (2009.01)
*H04W 76/04* (2009.01)

(52) U.S. Cl.
CPC .............. *H04W 48/12* (2013.01); *H04W 68/00* (2013.01); *H04W 68/025* (2013.01); *H04W 68/12* (2013.01); *H04W 76/048* (2013.01); *H04W 88/06* (2013.01)

(56) References Cited

U.S. PATENT DOCUMENTS

| | | | | |
|---|---|---|---|---|
| 8,958,847 | B2* | 2/2015 | Sanka | H04B 1/3816 455/558 |
| 9,119,172 | B2* | 8/2015 | Ponukumati | H04W 68/02 |
| 2007/0099614 | A1 | 5/2007 | Parekh et al. | |
| 2009/0070113 | A1* | 3/2009 | Gupta | G10L 15/22 704/257 |
| 2009/0131054 | A1 | 5/2009 | Zhang | |
| 2009/0215473 | A1 | 8/2009 | Hsu | |
| 2009/0239533 | A1 | 9/2009 | Somasundaram et al. | |
| 2010/0067379 | A1 | 3/2010 | Zhao et al. | |
| 2011/0319081 | A1 | 12/2011 | Deivasigamani et al. | |
| 2012/0057525 | A1 | 3/2012 | Hou | |
| 2012/0190362 | A1 | 7/2012 | Subbarayudu et al. | |
| 2012/0294694 | A1 | 11/2012 | Garot | |
| 2013/0150013 | A1 | 6/2013 | Liu et al. | |
| 2013/0275899 | A1* | 10/2013 | Schubert | G06F 3/0481 715/765 |
| 2013/0303203 | A1 | 11/2013 | Wang et al. | |
| 2013/0303240 | A1 | 11/2013 | Sanka et al. | |
| 2014/0112180 | A1 | 4/2014 | Axmon et al. | |
| 2014/0228070 | A1* | 8/2014 | Josso | H04W 68/00 455/552.1 |

FOREIGN PATENT DOCUMENTS

| | | |
|---|---|---|
| CN | 101827463 A | 9/2010 |
| EP | 2285158 A1 | 2/2011 |
| EP | 2533564 A1 | 12/2012 |
| WO | 2007051184 A2 | 5/2007 |
| WO | 2012089596 A1 | 7/2012 |
| WO | 2012140023 A1 | 10/2012 |
| WO | 2012168090 A1 | 12/2012 |

OTHER PUBLICATIONS

International Search Report and Written Opinion—PCT/US2015/047949—ISA/EPO—Dec. 1, 2015.

* cited by examiner

SYSTEM AND METHODS FOR IMPROVING PAGE DECODE PERFORMANCE DURING READING OF SYSTEM INFORMATION ON A MULTI-SIM WIRELESS COMMUNICATION DEVICE

RELATED APPLICATIONS

This application is a continuation-in-part of U.S. patent application Ser. No. 13/831,761, entitled "Methods and Apparatuses for Optimization of Multiple Subscription Device Performance" filed Mar. 15, 2013, which claims priority to provisional application 61/645,737 filed May 11, 2012, the entirety of which is hereby incorporated by reference.

FIELD

Aspects of the present disclosure relate generally to wireless communication systems, and more particularly to processing communications related to multiple subscriptions.

BACKGROUND

Multi-SIM (subscriber identification module) wireless devices have become increasing popular because of their flexibility in service options and other features. One type of multi-SIM wireless device, a dual-SIM dual standby (DSDS) device, enables both SIMs to be in idle mode waiting to begin communications, and but one at a time to participate in an active communication due to sharing of a single RF transceiver. Other multi-SIM devices may extend this capability to more than two SIMs, and may be configured with any number of SIMs greater than two.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless networks, a user equipment (UE) can have multiple subscriptions to one or more networks (e.g., by employing multiple subscriber identity module (SIM) cards or otherwise). Such a UE may include, but is not limited to, a dual-SIM, dual standby (DSDS) device. For example, a first subscription may be a first technology standard, such as Wideband Code Division Multiple Access (WCDMA), while a second subscription may support a second technology standard, such as Global System for Mobile Communications (GSM) Enhanced Data rates for GSM Evolution (EDGE) (also referred to as GERAN). Where the UE utilizes a single transceiver to communicate over the multiple subscriptions and/or networks, the UE can tune the transceiver to a given subscription and/or network during a given period of time to communicate therewith, but can only communicate in a single subscription and/or network at a given period of time. As such, when the UE has an active call with the first subscription, the UE may periodically tune away to the second subscription to monitor signals or acquire a connection. During such tune aways, the UE loses downlink information on the active call with the first subscription due to the inability to receive signals corresponding to the first subscription. Further, if the tune away mode persists for a relatively long time, then the network managing the active call of the first subscription may determine that the UE is no longer connected due to lack of activity, and thus may terminate the active call of the first subscription.

Furthermore, a DSDS UE may initially establish an active session on the first subscription, wherein the active session may use a shared radio resource for the majority of the time when the second subscription is in an idle state. Because the device has the second subscription, however, the device may also be required to periodically allow a second subscription to utilize the shared radio resource on the device. Such operation may be referred to as a "tune away" in the DSDS device.

In some situations, such as where the UE reselects a new cell for first subscription service, the UE may receive a master information block (MIB) that contains scheduling information regarding the timing of individual system information blocks (SIBs). The first subscription is often required to receive and decode the SIBs to receive important control information. In legacy systems, these SIB periods sometimes overlap with tune away periods, which may be referred to as "collision" of the two types of periods. Naturally, only one of these two operations may be completed at a given time where there exists a single radio resource, and legacy devices and networks typically prioritize receiving the SIB blocks associated with the first subscription over tune away to the second subscription to ensure that the ongoing data session on the first subscription is maintained. By prioritizing the SIB receive operations to tuning away, the second subscription may not receive pages destined for the second subscription from the second subscription network. As a result, the second subscription may miss one or more calls due to the SIB receive operations trumping tune away. Therefore, improvements in the operation of tune always are desired.

SUMMARY

Systems, methods, and devices of various embodiments enable a wireless communication device having at least a first SIM and second SIM associated with a shared radio frequency (RF) resource, in which the first SIM is connected to a first network that broadcasts system information blocks (SIBs), by receiving information about an upcoming page decode time for monitoring a paging channel associated with the second SIM, retrieving system information block (SIB) scheduling information associated with the first SIM, creating a RF resource release gap during the system information read period based on the SIB scheduling information and the upcoming page decode time, in which control of the RF resource is released by a modem stack associated with the first SIM, and providing control of the RF resource by a modem stack associated with the second SIM during the RF resource release gap. In some embodiment systems, methods and devices, the upcoming page decode time overlaps with a system information read period for the first SIM.

Embodiment methods may also include using the RF resource to monitor a paging channel of a second network associated with the second SIM during the RF resource release gap, and releasing control of the RF resource after the RF resource release gap. In some embodiment systems, methods and devices, the modem stack associated with the first SIM gains control of the RF resource following the RF resource release gap in order to resume the system information read period for the first SIM Embodiment methods may also include determining a paging cycle associated with the second SIM based on information about signaling on a paging channel of the second network, and determining whether an identification of SIBs missed during the RF resource release gap was received. If an identification of SIBs missed during the RF resource release gap was received, embodiment methods may also include determining whether the paging cycle associated with the second SIM is synchronous with a repetition period of at least one missed SIB. If the paging cycle associated with the second SIM is synchronous with a repetition period of at least one missed SIB, embodiment methods may also include creating subsequent RF resource release gaps for every other repetition of the paging cycle associated with the second SIM.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
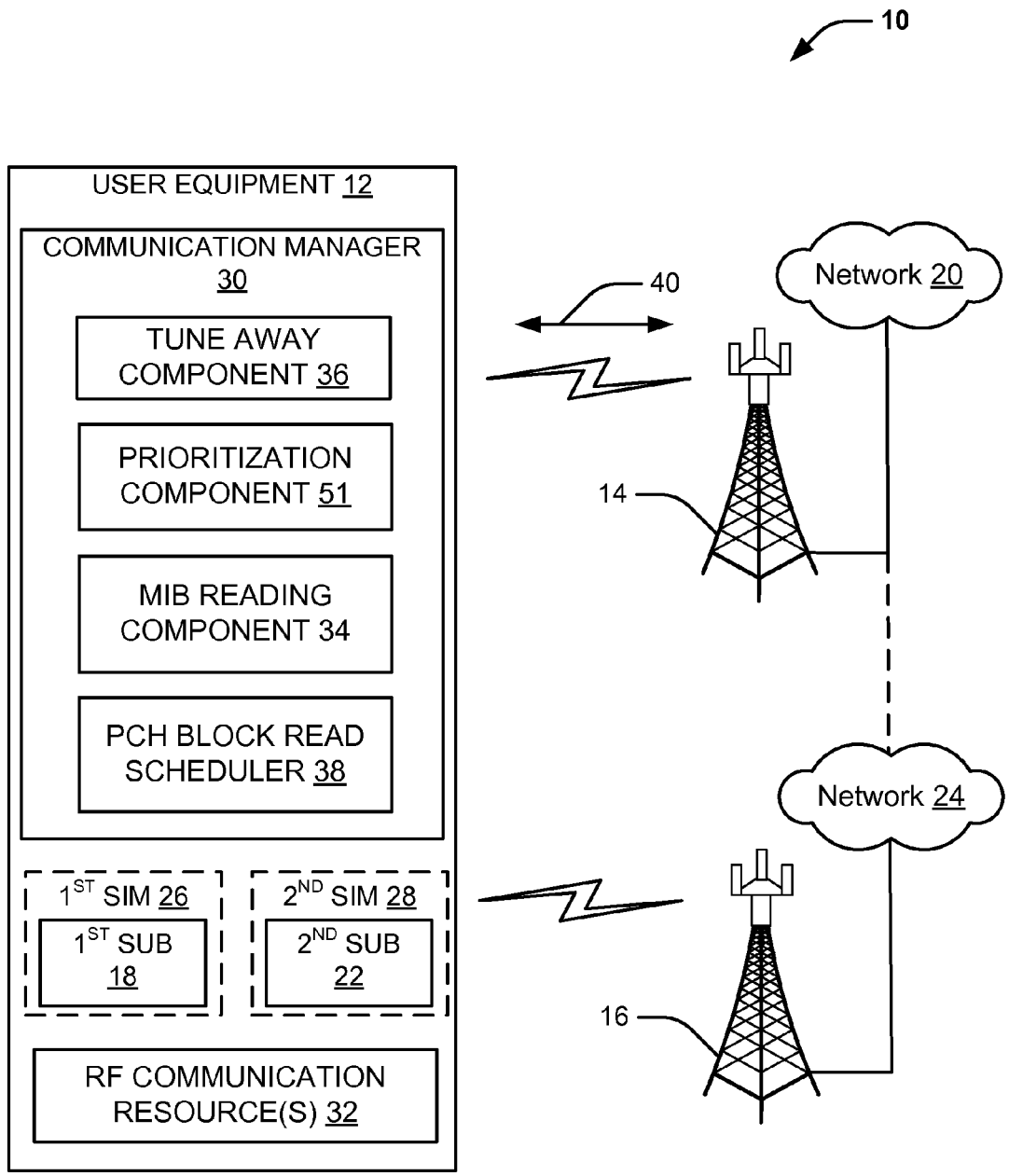
FIG. 1 is a schematic diagram of a communication network including an aspect of a multi-SIM user equipment that may perform tune away based on SIB scheduling information.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The various embodiments provide methods and apparatuses for improved tune away in multi-SIM devices whereby tune away to a second subscription for receiving a mobile terminated (MT) call or a page associated with such a call may be prioritized over scheduled system information block (SIB) procedures associated with a first subscription based, for example, on a user choosing to prioritize receiving a call on the second subscription over throughput on an active call on the first subscription. Specifically, in some embodiments, when a period of cell searching associated with a first subscription overlaps at least partially with a tune away period for use of UE radio resources by a second subscription, the tune away operations may be rescheduled to not overlap with SIB read periods associated with the first subscription as to minimize call or page drops on the second subscription. In some embodiments, when system information for a particular cell is being read for a first subscription (i.e., a "system information read period"), RF resource release gaps may be created to accommodate the paging decode time for the paging group associated with the second subscription, thereby prompting release of the RF resource by the first subscription. Therefore, the wireless device may use the RF resource to receive and decode paging requests for the second subscription, after which the RF resource may be released to resume decoding SIBs for the first subscription in the system information read period.

The terms "wireless device," "wireless communication device," "user equipment," and "UE" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "subscription," "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. Examples of SIMs include the Universal Subscriber Identity Module (USIM) provided for in the LTE 3GPP standard, and the Removable User Identity Module (R-UIM) provided for in the 3GPP2 standard. Universal Integrated Circuit Card (UICC) is another term for SIM.

The terms subscription and SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device," "dual-SIM wireless communication device," "dual-SIM dual-standby device," and "DSDS device" are used interchangeably to describe a wireless device that is configured with more than one SIM and allows idle-mode operations to be performed on two networks simultaneously, a well as selective communication on one network while performing idle-mode operations on the other network.

As used herein, the terms "power-saving mode," "power-saving-mode cycle," "discontinuous reception," and "DRX cycle" are used interchangeably to refer to an idle-mode process that involves alternating sleep periods (during which power consumption is minimized) and awake (or "wake-up") periods (in which normal power consumption and reception are returned and the wireless device monitors a channel by normal reception). The length of a power-saving-mode cycle, measured as the interval between the start of a wake-up period and the start of the next wake-up period, is typically signaled by the network.

Referring to FIG. 1, in one aspect, a wireless communication system 10 includes a user equipment (UE) (or "wireless communication device") 12 for prioritizing receiving MT calls associated with a second subscription 22 to SIB read procedures associated with a first subscription 18 to allow the second subscription 22 to receive one or more pages on the second subscription network. For instance, UE 12 can communicate with a first base station 14 and/or a second base station 16 utilizing multiple subscriptions to one or more networks. In an example, UE 12 can have a first subscription 18 related to first network 20 and second subscription 22 related to the same network, such as first network 20, or to a different network, such as second network 24. For instance, each subscription 18 and 22 may relate to a different account and/or different services on the same network or on different networks. In some aspects, each subscription 18 and 22 optionally may be maintained on a respective first subscriber identity module (SIM) 26 and a second SIM 28.

As such, in one aspect, UE 12 may be a multi-SIM, multi-standby device, such as a dual-SIM, dual standby (DSDS) device. Accordingly, UE 12 can at least communicate in first network 20 via a first base station 14 using first subscription 18. Moreover, UE 12 can communicate in second network 24 via first base station 14 and/or via a different base station, such as second base station 16, using second subscription 22. Further, first network 20 and second network 24 can use the same or different radio access technologies (RAT) to facilitate communicating with UEs. Additionally, first base station 14 and second base station 16 can each be a macrocell, microcell, small cell, picocell, femtocell, relay, Node B, mobile Node B, UE (e.g., communicating in peer-to-peer or ad-hoc mode with UE 12), or substantially any type of component that can communicate with UE 12 to provide wireless network access via a subscription at the UE 12.

UE 12 can include a communications manager component 30 configured to manage communication exchange signaling associated with first subscription 18 and/or second subscription 22 via one or more radio frequency (RF) communication resources 32. For example, communications manager component 30 may include and execute communication protocols and/or manage other standards-specific communication procedures using protocol and/or standards-specific instructions and/or subscription-specific configuration information that allows communications with first network 20 and second network 24. Further, RF communication resources 32 are configured to transmit and/or receive the communication exchange signaling to and/or from one or more base stations or other devices in wireless communication system 10. For example, RF communication resources 32 may include, but are not limited to, one or more of a transmitter, a receiver, a transceiver, protocol stacks, transmit chain components, and receive chain components. In some aspects, RF communication resources 32 may be dedicated to operate according to the standards and procedures of a single one of first subscription 18 or second subscription 22 at any given time. For instance, although not to be construed as limiting, RF communication resources 32 may be associated with a multi-SIM, multi-standby device, such as a dual-SIM, dual standby (DSDS) device.

In an aspect, communications manager component 30 may manage multi-network communications to enable mobility of UE 12, e.g. for a handover, and/or to seek to add to or improve communication quality and/or services. In one case, for example, communications manager component 30 may establish an active call 34 using first subscription 18 with one wireless network, for example first network 20, while attempting to acquire and/or maintain communication and/or service using second subscription 22 with the same network or with a different network, such as second network 24. According to an example, communications manager component 30 can establish active call 40 over first network 20, related to first subscription 18, via first base station 14. For instance, UE 12 and base station 14 can establish a connection to facilitate communicating in first network 20. Communications between UE 12 and first base station 14 can occur over logical channels, as described herein for example. UE 12 can activate the call based on requesting call establishment from base station 14, receiving a page for an incoming call from base station 26, etc. Moreover, for example, active call can be a data call (e.g., voice over interne protocol (VoIP) or similar technologies) where the first network 20 is a packet-switched (PS) network, a voice call where first network 20 is a circuit-switched (CS) network, and/or the like.

The UE 12 may have a layered software architecture to communicate with each of the first network 20 and the second network 24. The software architecture may be distributed among one or more baseband modem processors, which may be part of and/or connected to the RF communication resources 32. In various embodiments, such a layered software architecture may include multiple protocol stacks, each of which may be associated with a different subscription 18, 22 and different SIM 26, 28. The protocol stacks may be implemented to allow modem operation using information provisioned on multiple SIMs. Therefore, a protocol stack that may be executed by a baseband modem processor is interchangeably referred to herein as a modem stack.

Although described below with reference to UMTS-type and GSM-type communication layers, the modem stacks in various embodiments may support any of a variety of current and/or future protocols for wireless communications. For examples, the modem stacks in various embodiments may support networks using other radio access technologies described in 3GPP standards (e.g., Long Term Evolution (LTE), etc.), 3GPP2 standards (e.g., 1xRTT/cdma2000, Evolved Data Optimized (EVDO), Ultra Mobile Broadband (UMB), etc.) and/or IEEE standards Worldwide Interoperability for Microwave Access (WiMAX), Wi-Fi, etc.).

Figure 2:
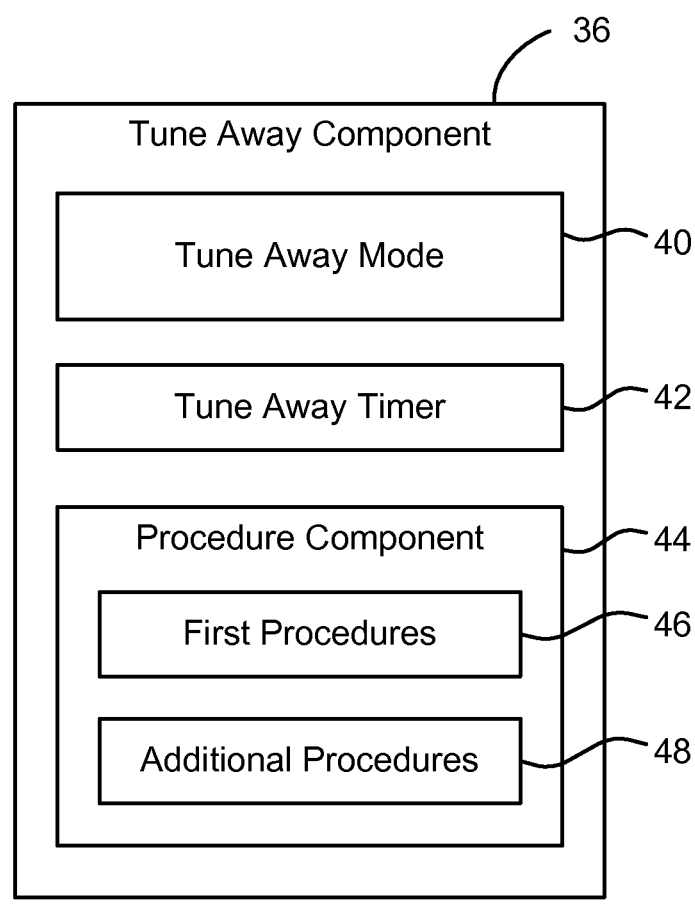
FIG. 2 is a schematic diagram of an aspect of the tune away component of FIG. 1.

In an additional aspect, referring to FIGS. 1-2, communication manager component 30 may also include a tune away component 36 configured to manage switching RF communication resources 32 from operating on active call 40 according to first subscription 18 to operating according to second subscription 22 to acquire and/or maintain communication and/or service with the same or with a different network. For example, tune away component 36 may maintain a periodic tune away timer 42 and, upon expiration of the tune away timer 42, is configured to change operation of RF communication resources 32 and trigger communications manager 30 to communicate according to second subscription 22. The execution of such a tune away, and the subsequent procedures, may be referred to as operating in a tune away mode 40. For instance, tune away component 36 causes RF communication resources 32 to switch or re-initialize an operating state, such as from a first subscription operating state (e.g., for a first network communication or service, like WCDMA communication) supporting active call 34 to a second subscription operating state (e.g., for a different first network service or for a different second network communication, like GSM communication). As such, initiating the tune away mode 40 may include, but is not limited to, one or more operations with respect to RF communication resources 32, such as performing a wake-up of the second subscription operating state, setting up a corresponding protocol stack for processing signals and data, enabling second subscription-related clocks, RF tuning including changing a receive and/or transmit frequency or frequency range of a transmitter or receiver or transceiver, and any other overhead procedure to enable communication using second subscription 22. Further, once the second subscription operating state is enabled, tune away component 36 can be configured to cause UE 12 and/or communication manager component 30 to perform, using second subscription 22, one or more procedures in the network, such as but not limited to page demodulation, idle mode monitoring procedures, periodic cell/location/routing updates, cell reselections, etc.

In one example, tune away component 36 initiates tune away mode 40 to communicate with a network different than the network supporting active call 34, e.g. second network 24, via second base station 28. As such, tune away component 36 enables RF communication resources 32 to determine whether idle-mode signals are received during the tune away mode 40 from second base station 28 corresponding to second network 24. Idle-mode signals can relate to substantially any signal broadcast in the network, e.g. second network 24, such as paging signals, broadcast control channel (BCCH) signals, or other signals that can correlate to mobility of UE 12 or otherwise. Further, tune away component 36 may utilize procedure component 44 to store or otherwise perform one or more procedures based on received signals from another component or subcomponent of the UE 12, or a received communication signal from the network including state information. As such, tune away component 36 enables UE 12 to perform at least a first procedure or a first set of procedures 46, including idle-mode procedures such as page demodulation. Additionally, depending on a state of communications and/or movement of UE 12 or whether idle-mode signals are received, tune away component 36 enables UE 12 to perform additional procedures 48, such as but not limited to received signal processing (e.g., determining if a received page relates to second subscription 22 and optionally responding if so), periodic cell/location/routing updates, cell reselections, etc. It should be noted that such additional procedures may take a relatively long period of time, such as a period of time longer than an inactivity timer corresponding to active call 34 of first subscription 18.

Figure 3:
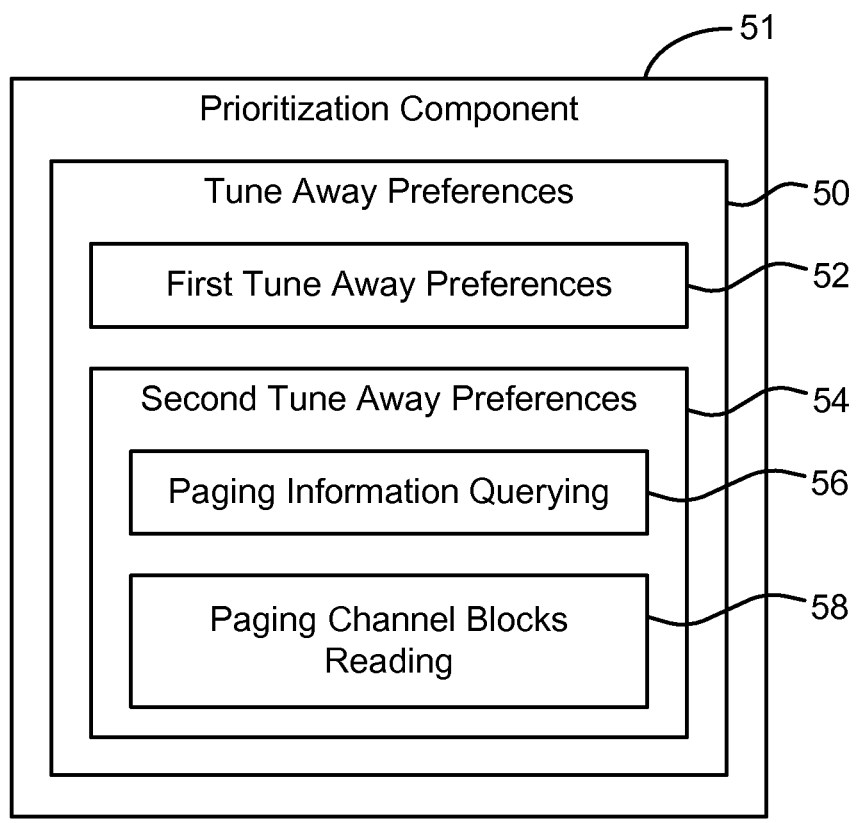
FIG. 3 is a schematic diagram of an aspect of the prioritization component of FIG. 1.
Figure 4:
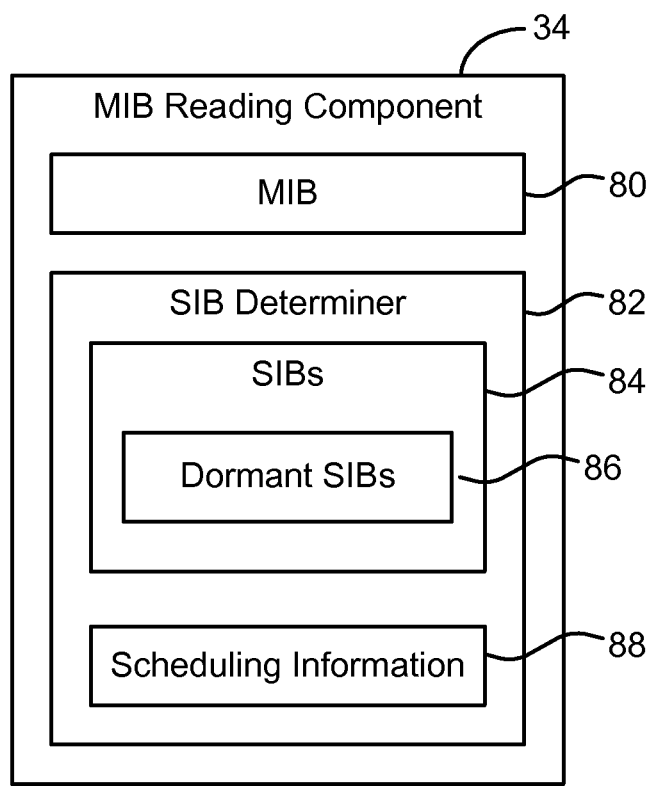
FIG. 4 is a schematic diagram of an aspect of the MIB reading component of FIG. 1.

In a further aspect, referring to FIGS. 1-3, communication manager 30 may include a prioritization component 51, which may be configured to prioritize tune away to a second subscription to receive MT calls or pages on UE 12 over procedures associated with improving throughput of an existing call on a first subscription on UE 12. For example, the prioritization component 51 may initiate tune away preferences component 50 to set a preference for receiving one or more mobile terminated calls over existing call throughput. In an aspect, the first tune away preferences component 52 may set first tune away preferences 52 and second tune away preferences 58. In some cases, the first tune away preferences 52 may prioritize first subscription procedures (e.g., first procedures 46, FIG. 2) over second subscription procedures (e.g., additional procedures 48, FIG. 2). In other cases, the second tune away preferences 54 may prioritize second subscription procedures (e.g., additional procedures 48, FIG. 2) over first subscription procedures (e.g., first procedures 46, FIG. 2). Further, the second tune away preferences 54 include, but are not limited to, paging information querying 56 and paging channel block reading 58. For instance, paging information querying 56 may enable querying of one or more second subscription entities (e.g., network 24, FIG. 1) for paging information during a period determined by the MIB reading component 34. Additionally, in some aspects, the user may select either the first tune away preferences 52 or the second tune away preferences 54 during UE 12 operation. The selection of such tune away preferences provides the various components and/or sub-components of the UE 12 with operating parameter characteristics. In other words, based on the preference selection, the UE 12 may be configured to prioritize tune away to a second subscription (e.g., second subscription 22, FIG. 1) to receive MT calls or pages on UE 12 over procedures associated with improving throughput of an existing call on a first subscription (e.g., first subscription 18, FIG. 1). It should be understood that prioritization component 51 may receive or otherwise determine a preference selection from any number of non-limiting sources, such as one or more networks (e.g., networks 20 and 24, FIG. 1), users, and/or an autonomous algorithm stored in the UE 12 automatically executing the functionalities described herein.

Furthermore, referring to FIGS. 1-4, communication manager 30 may, in an aspect, include MIB reading component 34, which may be configured to receive, decode, and read a MIB 80 received from a network entity. In an additional aspect, MIB reading component 34 may determine SIB scheduling information 88 from the MIB 80, and may therefore also be referred to as a "SIB scheduler." In other words, the MIB reading component 34 may discern when a network component will transmit SIBs 84 so that radio resources may be held by the first subscription (e.g., first subscription 18, FIG. 1) during these SIB periods to ensure receipt of important cell information therein. Further, the MIB reading component 34 may include SIB determiner 82, which may be configured to analyze the MIB 80 to determine dormant SIBs 86. For instance, SIB determiner 82 may utilize the scheduling information 88 from the MIB 80 received from the network (e.g., networks 20 and 24, FIG. 1) to determine the dormant SIBs 86. The dormant SIBs 86 may be periods in which an absence of scheduling information is identified. That is, using the scheduling information 88, the SIB determiner 82 searches for dormant SIBs 86 Accordingly, during such dormant SIBs 86 periods, tune away operations may be scheduled for the second subscription 22 to not overlap with SIB read periods associated with the first subscription 18 so as to minimize call or page drops on the second subscription 22. Furthermore, by searching for dormant SIBs, the UE 12 may efficiently allocate radio resources based on open periods rather than overlap scheduled periods. In some aspects, the MIB reading component 34 may provide the dormant SIBs 86 to the paging channel (PCH) block read scheduler 38 for second subscription scheduling purposes.

In an additional aspect, communication manager may include a PCH block read scheduler 38, which may be configured to arrange a schedule for handing over the DSDS UE radio resources to the second subscription (e.g., second subscription 22, FIG. 1) to coincide with one or more dormant SIB periods 86, which may correspond to periods during which the first subscription (e.g., first subscription 18, FIG. 1) is not scheduled to receive and/or read an SIB. In an aspect, PCH block read scheduler 38 may reschedule PCH block reads around SIB periods of the first subscription where a user has indicated that receiving MT calls on the second subscription is a higher priority than increased throughput on the first subscription.

Referring to FIGS. 1-5, in one aspect, UE 12 may include a specially programmed or configured computer device. UE 12 includes a processor 60 for carrying out processing functions associated with one or more of components and functions described herein. Processor 60 can include a single or multiple set of processors or multi-core processors. Moreover, processor 60 can be implemented as an integrated processing system and/or a distributed processing system. Additionally, processor 60 may be configured to perform the functions described herein related to tune away collision avoidance in multi-SIM UEs.

UE 12 further includes a memory 62, such as for storing data used herein and/or local versions of applications being executed by processor 60. Memory 62 can include any type of memory usable by a computer, such as random access memory (RAM), read only memory (ROM), tapes, magnetic discs, optical discs, volatile memory, non-volatile memory, and any combination thereof. Additionally, memory 62 may be configured to store data and/or code or computer-readable instructions for performing the functions described herein related to tune away collision avoidance in multi-SIM UEs.

Further, UE 12 includes a communications component 64 that provides for establishing and maintaining communications with one or more entities utilizing one or more of hardware, software, and services as described herein. Communications component 64 may carry communication signals between components on UE 12, as well as exchanging communication signals between UE 12 and external devices, such as devices located across a wired or wireless communications network and/or devices serially or locally connected to UE 12. For example, communications component 64 may include one or more buses, and may further include transmit chain components and receive chain components associated with a transmitter and receiver, respectively, or a transceiver, operable for interfacing with external devices. In an additional aspect, communications component 64 may be configured to perform the functions described herein related to tune away collision avoidance in multi-SIM UEs.

Additionally, UE 12 may further include a data store 66, which can be any suitable combination of hardware and/or software, that provides for mass storage of information, databases, and programs employed in connection with aspects described herein. For example, data store 66 may be a data repository for applications and data not currently being executed by processor 60, such as those related to the aspect described herein.

UE 12 may additionally include a user interface component 68 operable to receive inputs from a user of UE 12, and further operable to generate outputs for presentation to the user. User interface component 68 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 68 may include one or more output devices, including but not limited to a display, a speaker, a haptic feedback mechanism, a printer, any other mechanism capable of presenting an output to a user, or any combination thereof.

Additionally, UE 12 may include communication manager component 30, such as in specially programmed computer readable instructions or code, firmware, hardware, one or more processor modules, or some combination thereof.

Referring to FIGS. 1-6, in operation, a UE such as UE 12 (FIG. 1) may perform one aspect of a method 70 for improved tune away in DSDS devices. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 71, a UE may optionally set a preference for receiving one or more mobile terminated calls, for example, on a second subscription, over existing call throughput, for example, on a first subscription. For example, as described herein, the communication manager 30 may execute the prioritization component 51 (FIG. 3) to set a preference for receiving one or more mobile terminated calls on a second subscription 22 over existing call throughput on a first subscription 18. The prioritization component 51 may set first tune away preferences 52 and/or second tune away preferences 54. In some cases, the first tune away preferences 52 prioritize first subscription procedures over second subscription procedures. In other cases, the second tune away preferences 54 prioritize second subscription procedures to first subscription procedures.

Furthermore, at block 72, the UE may receive an MIB from a first subscription network entity on a first subscription in the UE. For example, the UE 12 may execute RF communication resources 32 (FIG. 1) to receive an MIB from a first subscription network entity (e.g., network 20, FIG. 1) on a first subscription (e.g., first subscription 18, FIG. 1).

In addition, at block 74, the UE may determine SIB scheduling information associated with the first subscription network entity. For example, as described herein, the communication manager 30 may execute the MIB reading component 34 (FIG. 4) to determine SIB scheduling information 88 associated with the first subscription entity (e.g., first subscription 18, FIG. 1). In some aspects, determining SIB scheduling information 88 associated with the first subscription network entity comprises determining SIB scheduling information 88 from the MIB 80. The MIB reading component 34 may provide the dormant SIBs 86 to the PCH block read scheduler 38 for PCH block read scheduling. In other aspects, the MIB reading component 34 may schedule one or more second subscription 22 procedures during the dormant SIBs 88.

Additionally, at block 76, the UE may tune away from the active call on the first subscription. For example, as described herein, the communication manager 30 may execute tune away component 36 (FIG. 1) to tune away from the active call 40 on the first subscription 18. In some aspects, the UE 12 may tune away from the active call 40 on the first subscription 18 during a dormant SIB period 86 derived from the SIB scheduling information 88.

Furthermore, at block 78, the UE may optionally read one or more PCH blocks on the second subscription during the dormant SIB period. For example, as described herein, the communication manager 30 (FIG. 1) may execute PCH block read scheduler 38 to read one or more PCH blocks on the second subscription 22 during the dormant SIB period 86. Moreover, the UE may also query a second subscription network entity for paging information during the dormant SIB period. For example, as described herein, the communication manager 30 may execute one or more subcomponents to query a second subscription network entity (e.g., network 24, FIG. 1) for paging information during the dormant SIB period 86.

Figure 5:
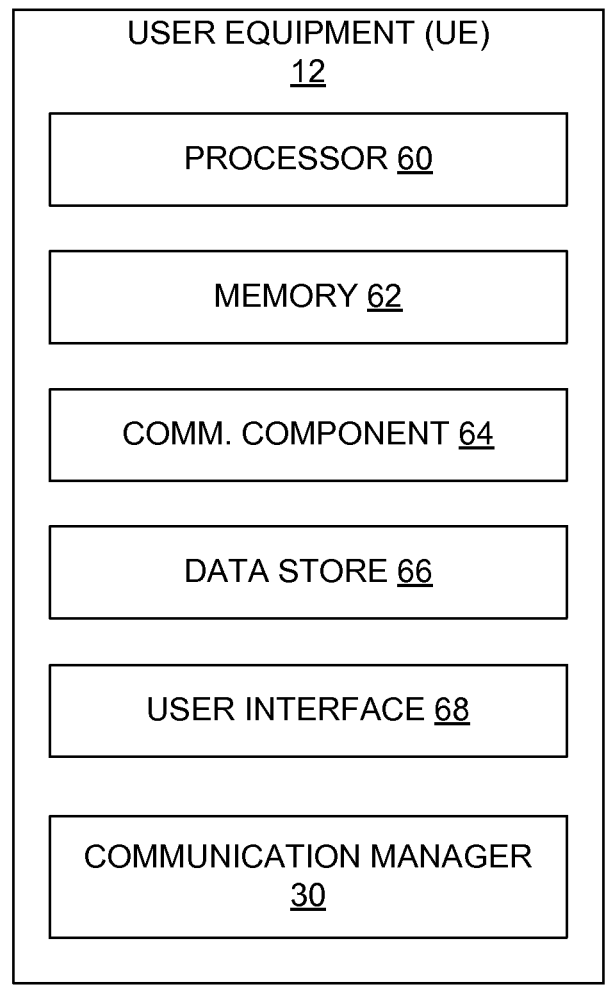
FIG. 5 is a schematic diagram of an aspect of the user equipment of FIG. 1.
Figure 6:
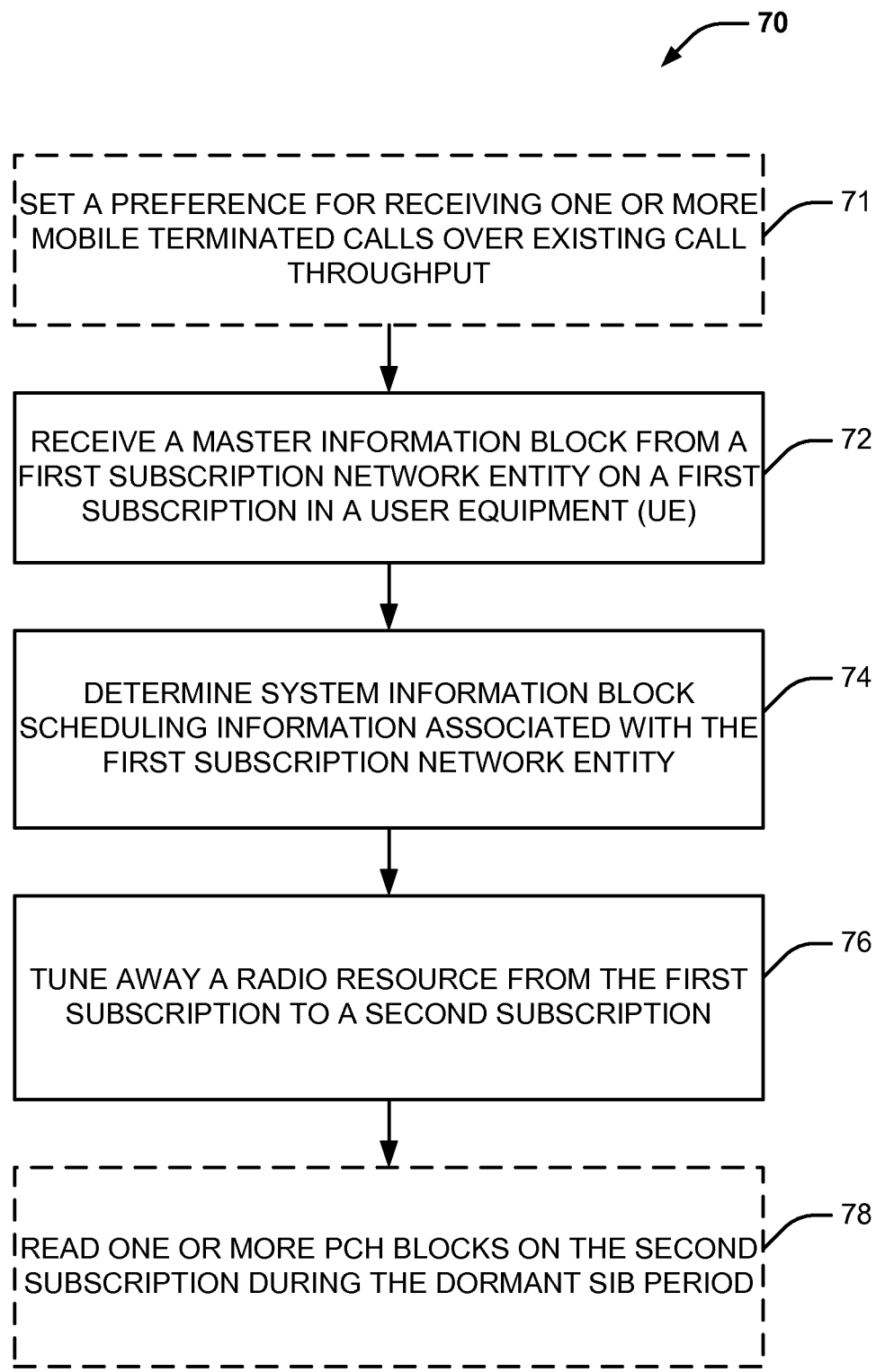
FIG. 6 is a flowchart of an aspect of a method of page performance optimization in a multi-SIM user equipment.
Figure 7:
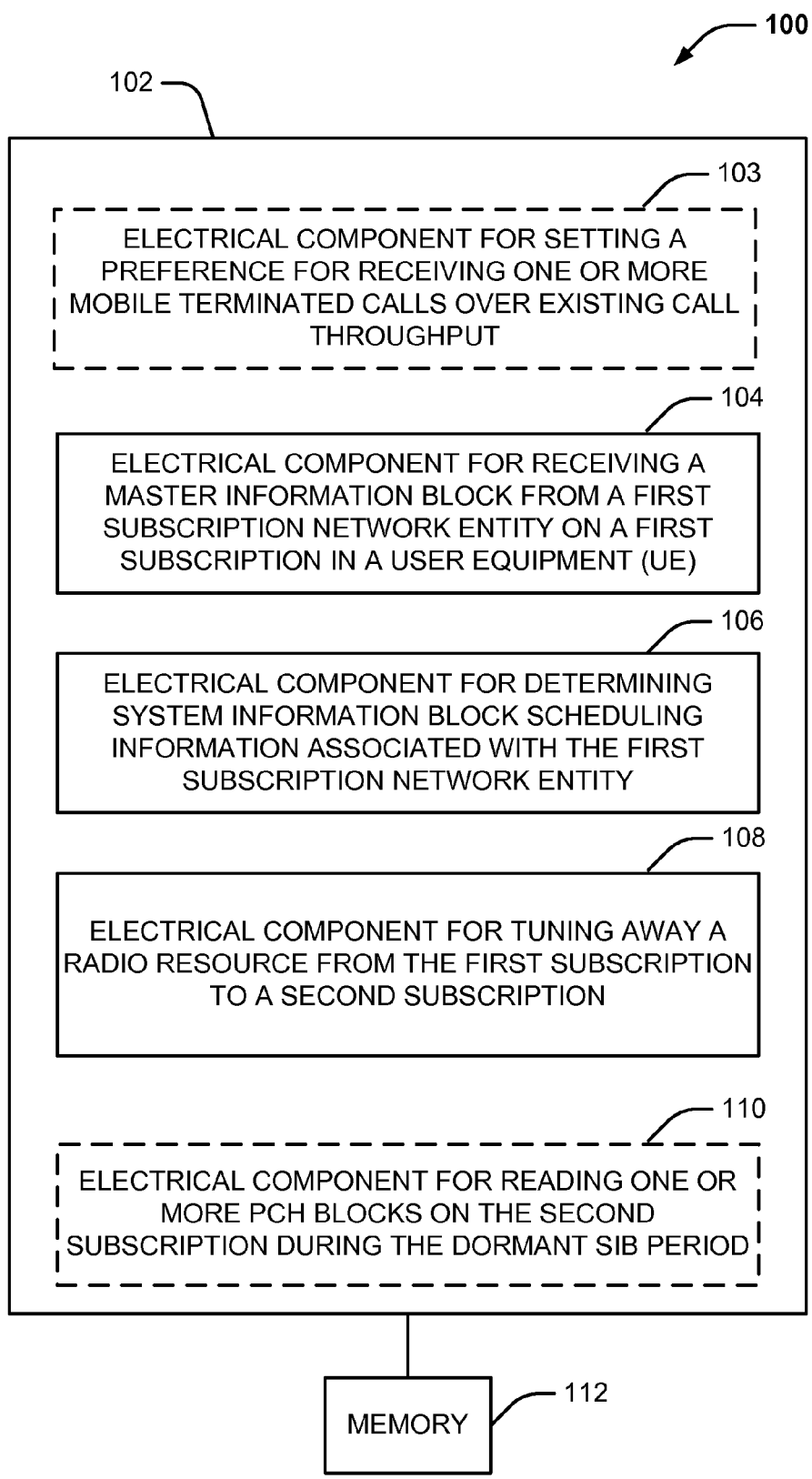
FIG. 7 is a schematic diagram of an aspect of a system for improved tune away and page performance in a multi-SIM user equipment.

Referring to FIG. 7, an example system 100 is displayed for improved tune away in a DSDS UE. For example, system 100 can reside at least partially within a user equipment, such as UE 12 (FIG. 1). It is to be appreciated that system 100 is represented as including functional blocks, which can be functional blocks that represent functions implemented by a processor, software, or combination thereof (e.g., firmware). System 100 includes a logical grouping 102 of electrical components that can act in conjunction. For instance, logical grouping 102 can optionally include an electrical component 103 for setting a preference for receiving one or more mobile terminated calls, for example, on a second subscription, over existing call throughput, for example, on a first subscription. In an aspect, electrical component 103 may include prioritization component 51 (FIGS. 1 and 2). Furthermore, logical grouping 102 can include an electrical component 104 for receiving an MIB from a first subscription network entity on a first subscription in the UE. In an aspect, electrical component 104 may include MIB reading component 34 (FIGS. 1 and 3) and/or communications component 64 (FIG. 5). In addition, logical grouping 102 can include an electrical component 106 for determining SIB scheduling information associated with the first subscription network entity. In an aspect, electrical component 106 may include MIB reading component 34 (FIG. 1). Additionally, logical grouping 102 can include an electrical component 108 for tuning away a radio resource from the first subscription to a second subscription during a dormant SIB period deciphered from the SIB scheduling information. In an aspect, electrical component 108 may include tune away component 36 (FIG. 1). Additionally, logical grouping 102 can include an optional electrical component 110 for reading one or more PCH blocks on the second subscription during the dormant SIB period. In an aspect, electrical component 110 may include processor 60 and/or communications component 64 (FIG. 5). In one example, electrical components 103, 104, 106, 108, and 110 can comprise at least one processor, or each electrical component 103, 104, 106, 108, and 110 can be a corresponding module of at least one processor. Moreover, in an additional or alternative example, electrical components 103, 104, 106, 108, and 110 can be a computer program product including a computer readable medium, where each electrical component 103, 104, 106, 108, and 110 can be corresponding code or instructions.

Additionally, system 100 can include a memory 112 that retains instructions for executing functions associated with the electrical components 103, 104, 106, 108, and 110, stores data used or obtained by the electrical components 103, 104, 106, 108, and 110, etc. While shown as being external to memory 112, it is to be understood that one or more of the electrical components 103, 104, 106, 108, and 110 can exist within memory 112.

For a subscription configured to connect to a WCDMA/UMTS network, the UE 12 may read system information from the broadcast channel (BCH) in order to perform any of a number of procedures, including a cell selection or reselection, a manual PLMN search, a transition from CELL_DCH to CELL_FACH or CELL_PCH state, etc. System information in WCDMA/UMTS systems may be organized into system information blocks (SIBs), each of which may have different characteristics, such as repetition rate and the instructions for the wireless communication device to reread the SIB.

For clarity, while the techniques and embodiments described herein relate to a wireless device configured with at least one WCDMA/UMTS subscription and/or GSM subscription, the embodiment techniques may be extended to subscriptions on other radio access networks (e.g., 1xRTT/CDMA2000, EVDO, LTE, WiMAX, Wi-Fi, etc.). In that regard, the message referred to herein as an "SIB" is also known by other terms in radio access technologies and standards, such as an "overhead message" as referred to in the 3GPP2 standard.

Scheduling information for SIBs for a particular WCDMA/UMTS cell may be provided by the network in a Master Information Block (MIB). The MIB and SIBs may be transmitted in a set of information messages over the primary common control physical channel (PCCPCH). In particular, every 20 ms, a BCH transport block containing a system information message may be broadcast using PCCPCH frames. The system information message may encapsulate segments of the MIB and/or SIBs, as well as a system frame number (SFN) that counts PCCPCH radio frames. Since PCCPCH radio frames are based on 10 ms intervals, two radio frames/PCCPCH frames may be used to broadcast each BCH transport block in a typical WCDMA/UMTS system.

In various embodiments, a RF resource (e.g., RF communication resource(s) 32 of FIG. 1) of a DSDS device (e.g., UE 12 of FIG. 1) may be configured to be shared between the SIMs, but may be employed by default to receive/decode SIBs from a first network enabled by a first SIM. As such, a modem stack associated with a second SIM of the device may often be in idle mode with respect to a second network. Depending on the radio access technology of the second network, such idle mode states may involve implementing a power saving mode that includes a cycle of sleep and awake states. For example, if the second network is a GSM network, during idle mode the modem stack associated with the second SIM may implement discontinuous reception (DRX).

Specifically, during a wake-up period (i.e., awake state), the modem stack associated with the second SIM may attempt to use the shared RF resource to monitor a paging channel of the second network for paging requests. In some embodiments, the second network may set the timing of the wake-up period for a paging group to which the second SIM belongs. During the sleep state, the modem stack may power off most processes and components, including the associated RF resource. In some networks, such as GSM networks, the duration of time in the wake-up period that may be used to monitor/decode messages on the paging channel may be around 6 ms. The duration of a complete power-saving mode cycle (e.g., DRX cycle), measured as the interval between the start of consecutive wake-up periods may typically be 470 ms. Similarly, the paging cycle in such embodiments (e.g., interval between the start of consecutive scheduled page decode/monitoring times) may typically also be 470 ms.

In various embodiments, the wireless communication device may store some SIBs for a particular cell so that upon moving to another cell and later returning, the device does not need to reread all SIBs for that particular cell. However, an initial reading of system information, such as for camping the first SIM on a particular cell for the first time, may take up to around 2 seconds. Given the typical power-saving mode cycle time of 470 ms, during an initial reading of system information, the wireless communication device may miss up to four paging decode times scheduled for monitoring by the modem stack associated with the second SIM.

The scheduling of SIBs broadcast by the first network associated with the first SIM may be determined from the MIB. In various embodiments, information decoded from the MIB may provide which SIBs are being scheduled, along with their periodicity. That is, SIBs may be broadcast using a repetitive schedule, and their identities and repetition periods may be determined from information decoded from the MIB. In various embodiments, the periodicity of a particular SIB (e.g., in a WCDMA/UMTS system) may be 320 ms, 640 ms, 1280 ms, etc. In some embodiments, SIB repetition may involve broadcasting blocks of higher importance more often and those of less importance sent less often. Also, in various embodiments, SIBs may not follow one another in consecutive PCCPCH frames, and therefore the wireless communication device may experience breaks in the reception of system information over the BCH. As described, these breaks in system information may be referred to as dormant SIB periods.

Figure 8A:
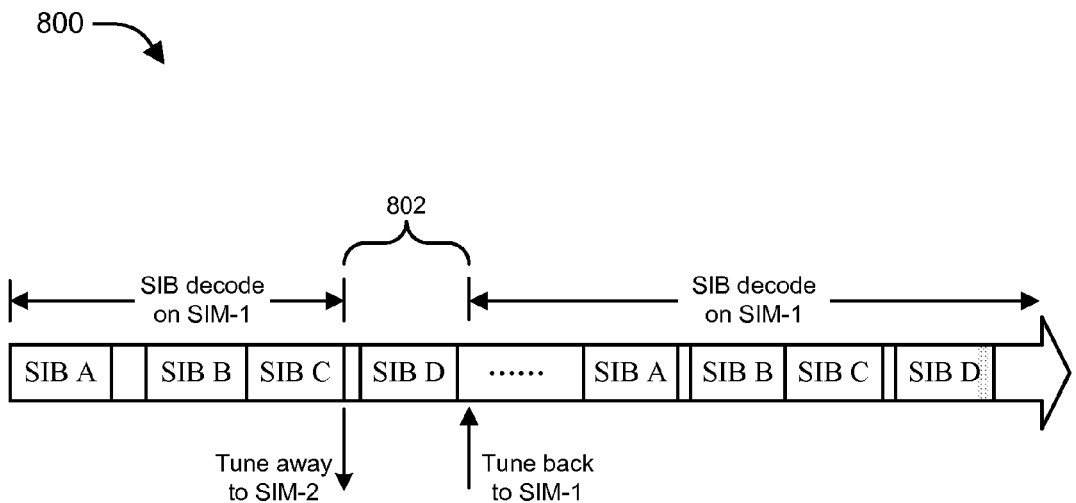
FIGS. 8A and 8B illustrate representative timelines showing activity on a radio frequency (RF) resource of a dual SIM wireless communication device according to embodiments.
Figure 8B:
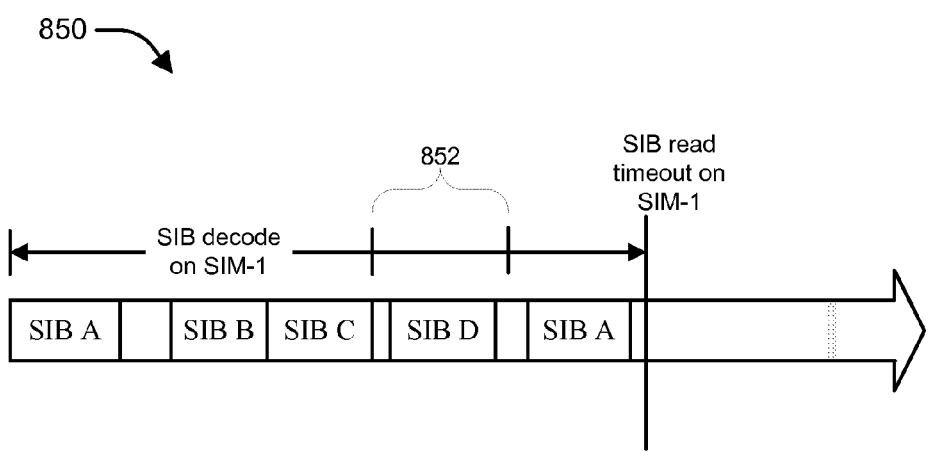

In various embodiments, based on the relative loss in page performance for communications on the second SIM compared to the value of continuous reading of SIBs for the first SIM, page decode performance may be mitigated for the second SIM by forcing the release of the RF resource by the modem stack associated with the first SIM. That is, the SIB scheduler for the network associated with the first SIM (e.g., the first network) may create a RF resource release gap. Example timing of operations on the RF resource is shown in FIGS. 8A and 8B. With reference to FIGS. 1-8B, an example set of SIB blocks "SIB A," "SIB B," "SIB C," and "SIB D" may represent any number of SIBs repeated at same or different periodicity.

In some embodiments, as shown in timeline 800, an RF resource release gap 802 may be configured to provide sufficient time to tear down the RF path for the modem stack associated with the first SIM ("SIM-1") and establish a path for the modem stack associated with the second SIM ("SIM-2") (7 ms). The RF resource release gap 802 may also provide sufficient time to decode the paging channel at a scheduled time (6 ms) and to tear down the RF resource path for the modem stack associated with the second SIM and reestablish the original path (7 ms). Therefore, in various embodiments, the RF resource release gap 802 may be around 20 ms. As such, the release of the RF resource by the modem stack associated with the first SIM may cause the wireless device processor to miss at most two SIBs. That is, in some embodiments, as shown in timeline 800, the wireless device processor may miss only one SIB D (e.g., the RF resource release gap 802 coincides with one BCH transport block or overlaps with one block and a break between blocks) or no SIBs (e.g., the RF resource release gap 802 does not overlap with any BCH transport block (not shown)). In some embodiments, the wireless device may miss one SIB segmented over two BCH transport blocks if the 20 ms release gap overlaps with the end of one block and the beginning of another block (not shown). Regardless, the 0-2 SIBs missed during the RF resource release gap 802 (e.g., SIB D) may be received during the next scheduling period (e.g., after 320 ms, 640 ms, 1280 ms, etc.), thereby minimizing any negative performance impact on cell selection or other process involving system information read periods associated with the first SIM.

In this manner, the wireless communication device may be allowed to decode the paging channel at the proper time to receive pages associated with the second SIM. Following such reading of the paging channel, the modem stack associated with the second SIM may release control of the RF resource, allowing the device to resume reading system information associated with the first SIM.

In some embodiments, conditions may exist in which, even if there is an upcoming page decode time associated with the second SIM, the modem stack associated with the first SIM does not release the RF resource. An example of such conditions may be an approaching SIB read timeout due to delays in decoding mandatory SIBs, shown in timeline 850. In order to increase the probability of completing the SIB decode process, if an upcoming page decode time for the second SIM is scheduled close enough to (e.g., within six seconds of) an SIB read timeout, the wireless communication device may prevent the RF resource release gap 852 that would otherwise have been created by the SIB scheduler of the first network. This time can be anywhere from few milliseconds to couple of seconds. In various embodiments once the SIB read timeout occurs or the SIB decode process is complete, creation of RF resource release gaps to tune away for paging channel decode times of the second SIM may again be enabled.

Figure 9A:
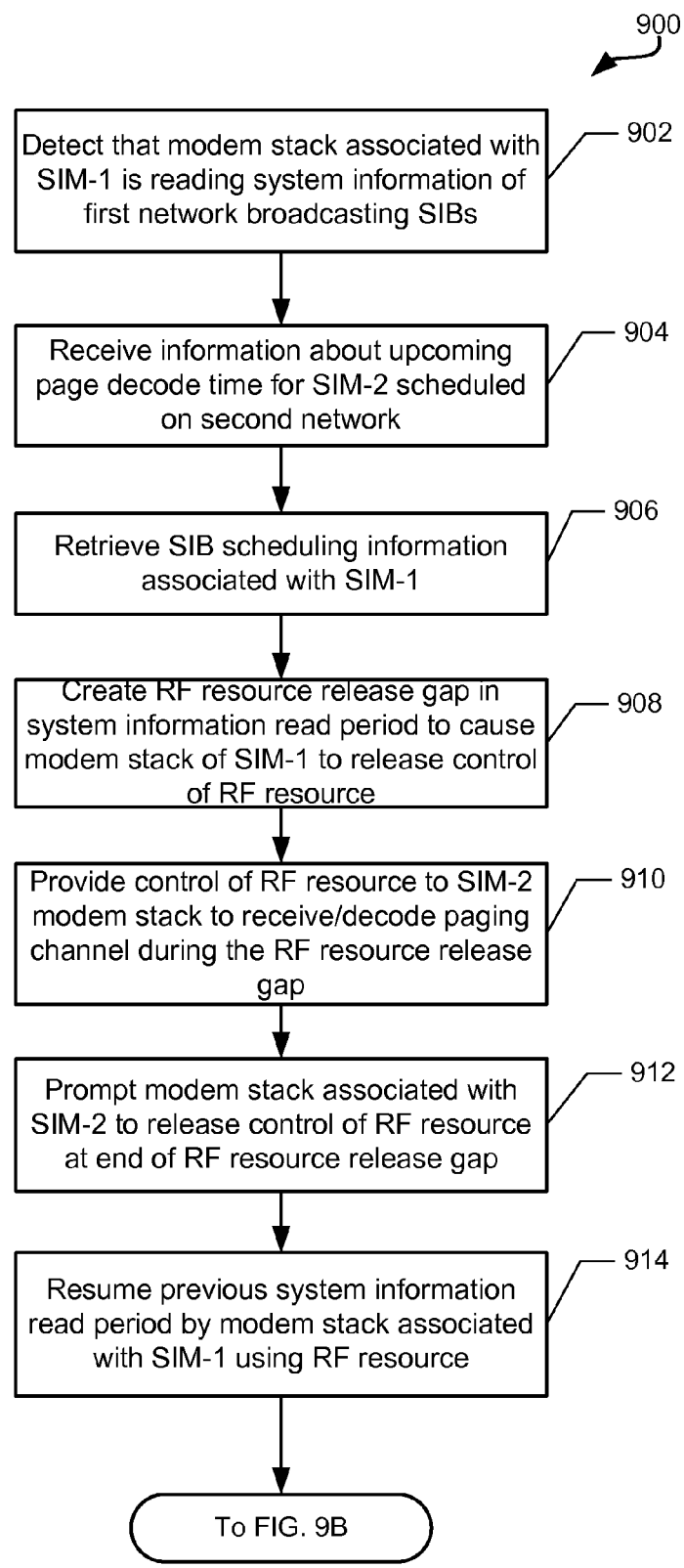
FIGS. 9A and 9B are process flow diagrams illustrating a method for mediating the impact of reading SIBs for a first subscription on page decode performance for a second subscription in an example dual-SIM wireless communication device according to various embodiments.
Figure 9B:
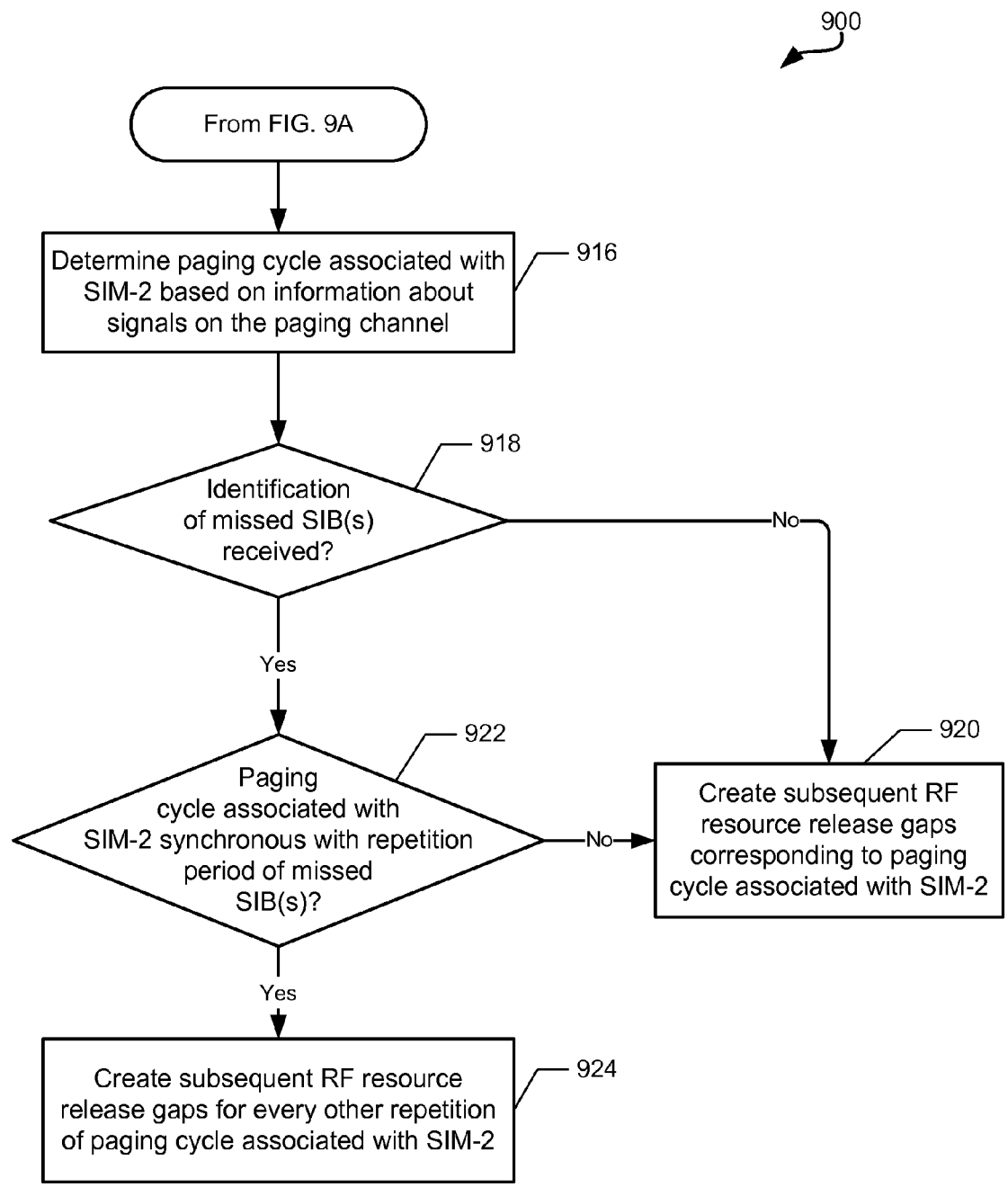

While described with respect to an initial reading of system information for camping the first SIM, in some embodiments, conditions involving mobility may also be associated with preventing the release of the RF resource. For example, if there is an active voice call on the first SIM, creation of RF resource release gaps may be prevented even for an upcoming page decode time for the second SIM. In various embodiments, once the voice call terminates, creation of RF resource release gaps to tune away for paging channel decode times of the second SIM may again be enabled. FIGS. 9A and 9B illustrate a method 900 according to various embodiments for improving page decode performance on a SIM of a DSDS wireless communication device in which a shared radio resource (e.g., part of RF communication resources 32 in FIG. 1) is being used to read system information and decode SIBs associated with a different SIM. With reference to FIGS. 1-9B, the operations of method 900 may be implemented by one or more processors of the wireless device (or UE) 12, such as the processor 60 (FIG. 5), and/or baseband modem processor(s) that may be part of, or coupled to, RF communication resources 32 (FIG. 1) or a communications component 64 (FIG. 5).

In block 902, the wireless device processor of a DSDS device configured to support at least first and second SIMs may detect that a modem stack associated with the first SIM is reading system information for a first network that is broadcasting SIBs. In block 904, the wireless device processor may receive information about an upcoming page decode time for the second SIM ("SIM-2") to monitor a paging channel on a second network associated with the second SIM. That is, the wireless device processor may be notified of a time interval during which a paging group that includes the second SIM may receive communications (e.g., incoming calls) over the second network. In various embodiments, a modem stack associated with the second SIM may provide such information to a SIB scheduler (e.g., MIB reading component 34 (FIG. 4)).

In block 906, the wireless device processor may retrieve SIB scheduling information associated with the first SIM. As discussed above, in various embodiments the modem stack associated with the first SIM may have received a MIB broadcast by the first network, and the SIB scheduling information may be obtained by decoding the received MIB. For example, such SIB scheduling information may identify a plurality of SIBs to be decoded, as well as a periodicity associated with each of the plurality of SIBs. In various embodiments, once the SIB scheduling information is obtained by the modem stack associated with the first SIM, the SIB scheduling information may be stored and later retrieved for use by the SIB scheduler (e.g., MIB reading component 34 (FIG. 4)).

Based on the retrieved SIB scheduling information and the information about the upcoming page decode time for the second SIM, in block 908 the wireless device processor may create a RF resource release gap in the system information read period to release control of the shared RF resource by the modem stack associated with the first SIM. In some embodiments, the RF resource release gap may be created by forcing a short sleep state on the modem stack associated with the first SIM to override the automatic processes taking place by the SIB scheduler. In some embodiments, the RF resource release gap may be created by masking the SIBs being broadcast by the first network, thereby mimicking a dormant SIB period on the SIB scheduler. As a result, the SIB scheduler may be configured to respond as it would if no SIBs were being broadcast, which includes causing release of the shared RF resource.

In some embodiments, the duration of the RF resource release gap may be just long enough to enable the shared RF resource for use by the modem stack associated with the second SIM to decode the paging channel for the second network at the scheduled time and to re-enable the shared RF resource for use by the modem stack associated with the first SIM. The specific durations required for each of these activities may depend on the particular network and radio access technology enabled by the second SIM and implemented by the second network. As discussed, for a second SIM configured to connect to a GSM network, the RF resource release gap may be around 20 ms, centered at the 6 ms upcoming page decode time.

Once the RF release gap is reached and the shared RF resource is released by the modem stack associated with the first SIM, in block 910 the wireless device processor may provide the modem stack associated with the second SIM with control of the shared RF resource to monitor the paging channel during the assigned page decode time. In block 912, the wireless device processor may prompt release of the RF resource by the modem stack associated with the second SIM at the end of the RF resource release gap. In block 914, the wireless device processor may cause the modem stack associated with the first SIM to resume the previous system information read period (i.e., resume decoding SIBs) by returning control of the shared RF resource. The wireless device processor may proceed to block 916 (FIG. 9B).

The wireless device processor may receive information about the timing cycle for signals on the paging channel of the second network, and in block 916 the wireless device processor may determine the paging cycle associated with the second SIM based on the received paging channel signal information. In some embodiments, the information about the timing cycle for signals on the paging channel may be provided to the SIB scheduler (e.g., MIB reading component 34 (FIG. 4)) implemented by the wireless device processor by the modem stack associated with the second SIM.

In determination block 918, the wireless device processor may determine whether an identification of one or more SIBs that was missed during the RF resource release gap has been received. Such identification may be received, for example, from the modem stack associated with the first SIM, unless no SIBs were missed. In response to determining that no identification of missed SIBs has been received (i.e., determination block 918="No"), the wireless device processor may create subsequent RF resource release gaps in the system information read period(s) that correspond to the timing of the paging cycle associated with the second SIM in block 920.

In response to determining that an identification of one or more SIB that was missed during the RF resource release gap has been received (i.e., determination block 918="Yes"), the wireless device processor may determine whether the paging cycle associated with the second SIM (i.e., from block 916) is synchronous with the repetition period of any missed SIBs in determination block 922. In various embodiments, the repetition period of a missed SIB may be retrieved from the SIB scheduling information decoded from the MIB, which, as discussed above, includes a periodicity for each SIB to be decoded. Therefore, the wireless device processor may compare the value determined in block 916 to a periodicity for each identified missed SIB.

In response to determining that the paging cycle associated with the second SIM (i.e., from block 916) is not synchronous with the repetition period of any missed SIBs (i.e., determination block 922="No"), the wireless device processor may create subsequent RF resource release gaps in block 920 as described. In response to determining that the paging cycle associated with the second SIM is synchronous with the repetition period of any missed SIBs (i.e., determination block 922="Yes"), the wireless device processor may create subsequent RF resource release gaps for every other repetition of the paging cycle associated with the second SIM in block 924. In this manner, a missed SIB that would otherwise continue to be missed during each RF resource release gap due to alignment with the paging cycle may be received when repeated in its next broadcast.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

References to a first subscription/SIM-1 and a second subscription/SIM-2 herein are arbitrary and for the purposes of clarifying descriptions of the various embodiments, and may apply to either or any SIM of the wireless device. For example, while various embodiments and claims refer to use of the shared RF resource for reading SIBs associated with the first subscription and monitoring a paging channel associated with the second subscription, the various embodiments and claims are equally applicable to use of the shared RF resource for reading SIBs associated with the second subscription and monitoring a paging channel associated with the first subscription. Further, such designations of subscriptions/SIMs may be switched or reversed between instances of executing the methods of the various embodiments.

Figure 10:
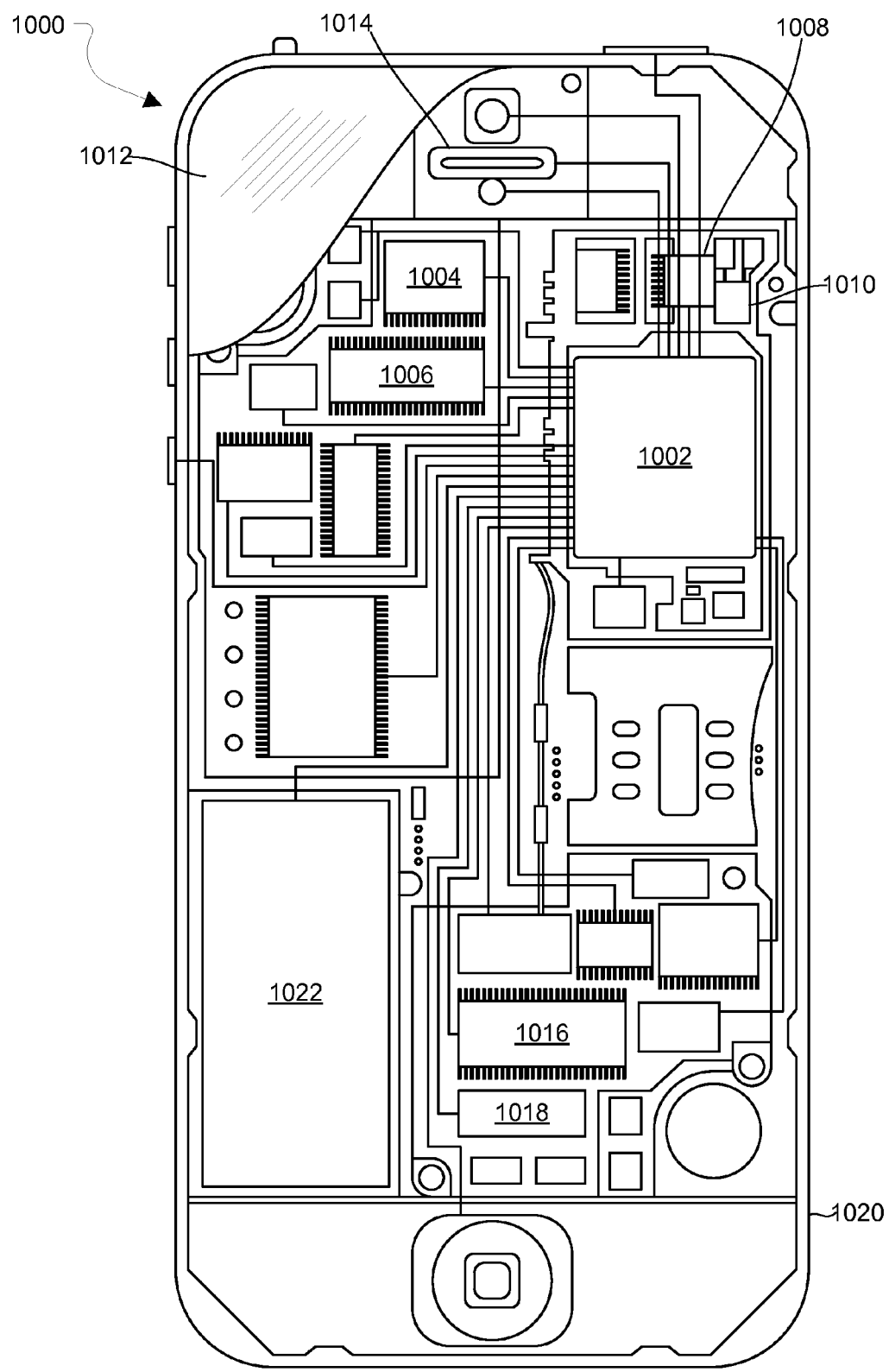
FIG. 10 is a component diagram of an example wireless communication device suitable for use with various embodiments.

Various embodiments may be implemented in any of a variety of wireless devices, an example of which is illustrated in FIG. 10. For example, the wireless device 1000 (which may correspond, for example, to the UE 12 in FIGS. 1 and 5) may include a processor 1002 coupled to a touchscreen controller 1004 and an internal memory 1006. The processor 1002 may be one or more multicore integrated circuits (ICs) designated for general or specific processing tasks. The internal memory 1006 may be volatile or non-volatile memory, and may also be secure and/or encrypted memory, or unsecure and/or unencrypted memory, or any combination thereof.

The touchscreen controller 1004 and the processor 1002 may also be coupled to a touchscreen panel 1012, such as a resistive-sensing touchscreen, capacitive-sensing touchscreen, infrared sensing touchscreen, etc. The wireless device 1000 may have one or more radio signal transceivers 1008 (e.g., Peanut®, Bluetooth®, Zigbee®, Wi-Fi, RF radio) and antennae 1010, for sending and receiving, coupled to each other and/or to the processor 1002. The transceivers 1008 and antennae 1010 may be used with the above-mentioned circuitry to implement the various wireless transmission protocol stacks and interfaces. The wireless device 1000 may include a cellular network wireless modem chip 1016 that enables communication via a cellular network and is coupled to the processor. The wireless device 1000 may include a peripheral device connection interface 1018 coupled to the processor 1002. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown). The wireless device 1000 may also include speakers 1014 for providing audio outputs. The wireless device 1000 may also include a housing 1020, constructed of a plastic, metal, or a combination of materials, for containing all or some of the components discussed herein. The wireless device 1000 may include a power source 1022 coupled to the processor 1002, such as a disposable or rechargeable battery. The rechargeable battery may also be coupled to the peripheral device connection port to receive a charging current from a source external to the wireless device 1000.

Figure 11:
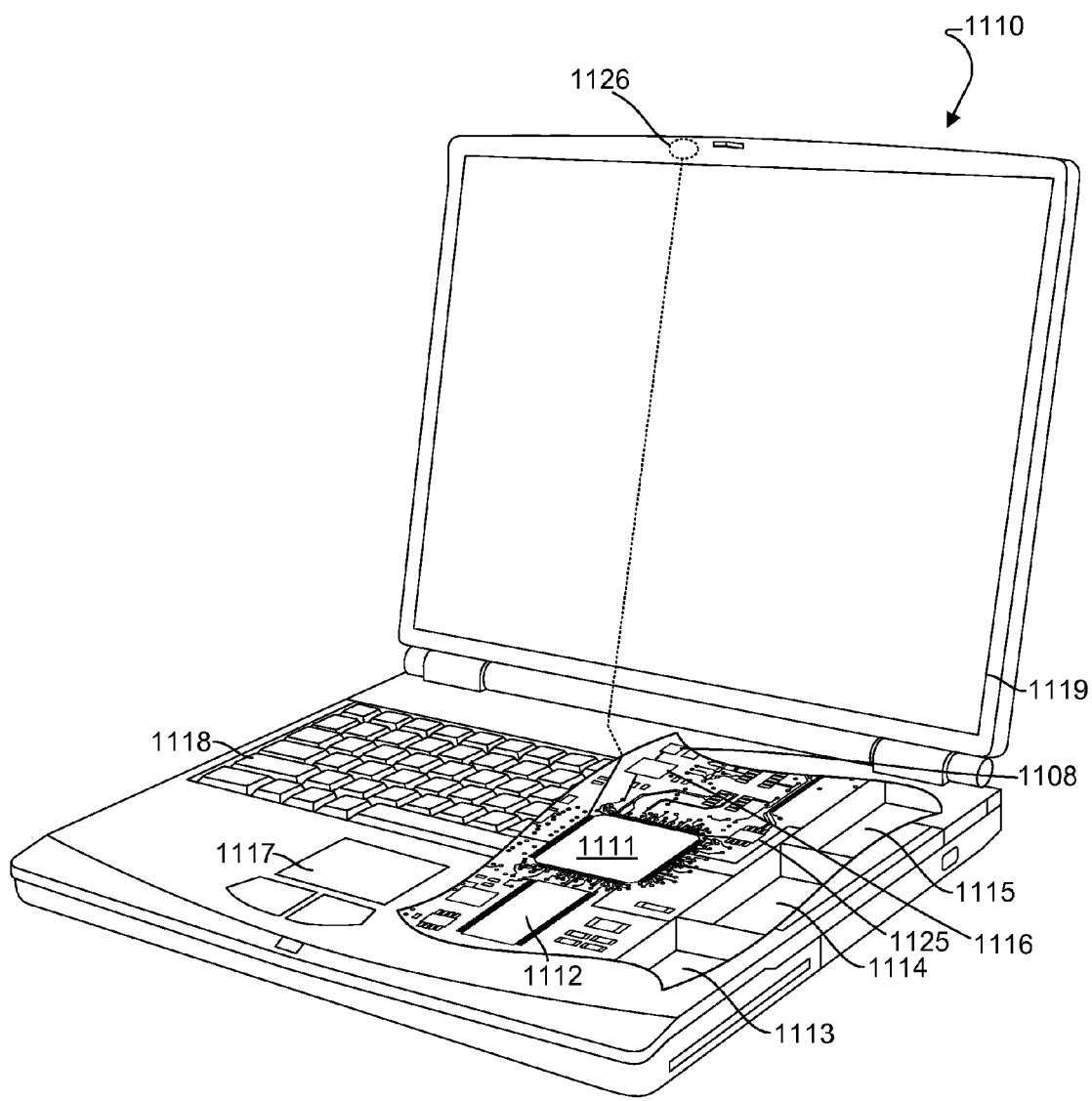
FIG. 11 is a component diagram of another example wireless communication device suitable for use with various embodiments.

Various embodiments described above may also be implemented within a variety of personal computing devices, such as a laptop computer 1100 (which may correspond, for example, the UE 12 in FIGS. 1 and 5) as illustrated in FIG. 11. Many laptop computers include a touchpad touch surface 1117 that serves as the computer's pointing device, and thus may receive drag, scroll, and flick gestures similar to those implemented on wireless computing devices equipped with a touch screen display and described above. The laptop computer 1100 will typically include a processor 1111 coupled to volatile memory 1112 and a large capacity nonvolatile memory, such as a disk drive 1113 of Flash memory. The laptop computer 1100 may also include a floppy disc drive 1114 and a compact disc (CD) drive 1115 coupled to the processor 1111. The laptop computer 1100 may also include a number of connector ports coupled to the processor 1111 for establishing data connections or receiving external memory devices, such as a USB or FireWire® connector sockets, or other network connection circuits for coupling the processor 1111 to a network. In a notebook configuration, the computer housing includes the touchpad touch surface 1117, the keyboard 1118, and the display 1119 all coupled to the processor 1111. Other configurations of the computing device may include a computer mouse or trackball coupled to the processor (e.g., via a USB input) as are well known, which may also be use in conjunction with various embodiments.

The processors 1002 and 1111 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 1006, 1112 and 1113 before they are accessed and loaded into the processors 1002 and 1111. The processors 1002 and 1111 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1002, 1111, including internal memory or removable memory plugged into the device and memory within the processor 1002 and 1111, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

What is claimed is:

1. A method of improving performance of a multi-subscriber identification module (SIM) wireless communication device having at least a first SIM and second SIM associated with a shared radio frequency (RF) resource, wherein the first SIM is connected to a first network that broadcasts system information blocks (SIBs), the method comprising:
    receiving information about an upcoming page decode time for monitoring a paging channel associated with the second SIM, wherein the upcoming page decode time overlaps with a system information read period for the first SIM;
    retrieving system information block (SIB) scheduling information associated with the first SIM;
    creating a RF resource release gap during the system information read period based on the SIB scheduling information and the upcoming page decode time, wherein control of the RF resource is released by a modem stack associated with the first SIM; and
    providing control of the RF resource to a modem stack associated with the second SIM during the RF resource release gap.

2. The method of claim 1, further comprising:
    using the RF resource to monitor a paging channel of a second network associated with the second SIM during the RF resource release gap; and
    providing control of the RF resource to the modem stack associated with the first SIM to resume the system information read period for the first SIM after the RF resource release gap.

3. The method of claim 2, further comprising:
    determining a paging cycle associated with the second SIM based on information about signaling on the paging channel of the second network;
    determining whether an identification of SIBs missed during the RF resource release gap was received; and
    determining whether the paging cycle associated with the second SIM is synchronous with a repetition period of at least one missed SIB in response to determining that an identification of SIBs missed during the RF resource release gap was received.

4. The method of claim 3, further comprising:
    creating subsequent RF resource release gaps corresponding to paging cycles associated with the second SIM in response to determining that no identification of SIBs missed during the RF resource release gap was received.

5. The method of claim 2, wherein a radio access technology implemented by the first network comprises Wideband Code Division Multiple Access (WCDMA), and wherein a radio access technology implemented by the second network comprises Global System for Mobile Communications (GSM).

6. The method of claim 2, wherein a radio access technology implemented by the first network is different from a radio access technology implemented by the second network.

7. The method of claim 3, further comprising:
creating subsequent RF resource release gaps for every other repetition of the paging cycle associated with the second SIM in response to determining that an identification of SIBs missed during the RF resource release gap was received and that the paging cycle associated with the second SIM is synchronous with a repetition period of at least one missed SIB.

8. The method of claim 3, wherein 0-2 SIBs are missed during the RF resource release gap, and wherein the paging cycle associated with the second SIM has a duration of about 470 ms.

9. The method of claim 1, wherein the SIB scheduling information identifies a master information block (MIB) associated with the first network, a plurality of SIBs to be decoded, and a repetition period associated with each of the plurality of SIBs.

10. The method of claim 9, wherein the SIB scheduling information is derived from information decoded from the MIB, and wherein the SIB scheduling information enables identification of dormant SIB periods that are characterized by an absence of a scheduling information SIB to be decoded.

11. The method of claim 1, wherein creating the RF resource release gap during the system information read period based on the SIB scheduling information and the upcoming page decode time comprises initiating a short sleep state to override the SIB scheduling information.

12. The method of claim 1, wherein creating the RF resource release gap during the system information read period based on the SIB scheduling information and the upcoming page decode time comprises masking SIBs that are broadcast from the first network, wherein the masking the SIBs mimics dormant SIB periods.

13. The method of claim 12, wherein the dormant SIB periods comprise periods characterized by an absence SIBs scheduled to be decoded.

14. The method of claim 1, further comprising:
identifying an upcoming SIB decode timeout;
determining whether the upcoming page decode time is scheduled to occur within a preset time threshold prior to the SIB decode timeout; and
preventing creation of the RF resource release gap in response to determining that the upcoming page decode time is scheduled to occur within a preset time threshold prior to the SIB decode timeout.

15. A multi-subscriber identification module (SIM) wireless communication device, comprising:
a radio frequency (RF) resource, wherein the RF resource is configured to be associated with at least a first SIM and a second SIM;
a processor coupled to the RF resource and configured to couple with the first and second SIMs, wherein the processor is configured to:
receive information about an upcoming page decode time for monitoring a paging channel associated with the second SIM, wherein the upcoming page decode time overlaps with a system information read period of a first network associated with the first SIM;
retrieve system information block (SIB) scheduling information associated with the first SIM;
create a RF resource release gap during the system information read period based on the SIB scheduling information and the upcoming page decode time, wherein control of the RF resource is released by a modem stack associated with the first SIM; and
provide control of the RF resource to a modem stack associated with the second SIM during the RF resource release gap.

16. The multi-SIM wireless communication device of claim 15, wherein the processor is further configured to:
use the RF resource to monitor a paging channel of a second network associated with the second SIM during the RF resource release gap; and
provide control of the RF resource to the modem stack associated with the first SIM to resume the system information read period for the first SIM after the RF resource release gap.

17. The multi-SIM wireless communication device of claim 16, wherein a radio access technology implemented by the first network comprises Wideband Code Division Multiple Access (WCDMA), and wherein a radio access technology implemented by the second network comprises Global System for Mobile Communications (GSM).

18. The multi-SIM wireless communication device of claim 16, wherein a radio access technology implemented by the first network is different from a radio access technology implemented by the second network.

19. The multi-SIM wireless communication device of claim 16, wherein the processor is further configured to:
determine a paging cycle associated with the second SIM based on information about signaling on the paging channel of the second network;
determine whether an identification of SIBs missed during the RF resource release gap was received; and
determine whether the paging cycle associated with the second SIM is synchronous with a repetition period of at least one missed SIB in response to determine that an identification of SIBs missed during the RF resource release gap was received.

20. The multi-SIM wireless communication device of claim 19, wherein the processor is further configured to create subsequent RF resource release gaps corresponding to paging cycles associated with the second SIM in response to determine that no identification of SIBs missed during the RF resource release gap was received.

21. The multi-SIM wireless communication device of claim 19, wherein the processor is further configured to create subsequent RF resource release gaps for every other repetition of the paging cycle associated with the second SIM in response to determine that an identification of SIBs missed during the RF resource release gap was received and that the paging cycle associated with the second SIM is synchronous with a repetition period of at least one missed SIB.

22. The multi-SIM wireless communication device of claim 19, wherein 0-2 SIBs are missed during the RF resource release gap, and wherein the paging cycle associated with the second SIM has a duration of about 470 ms.

23. The multi-SIM wireless communication device of claim 15, wherein the SIB scheduling information identifies a master information block (MIB) associated with the first network, a plurality of SIBs to be decoded, and a repetition period associated with each of the plurality of SIBs.

24. The multi-SIM wireless communication device of claim 23, wherein the SIB scheduling information is derived from information decoded from the MIB, and wherein the SIB scheduling information enables identification of dormant SIB periods that are characterized by an absence of scheduling information SIB to be decoded.

25. The multi-SIM wireless communication device of claim 15, wherein the processor is further configured to create the RF resource release gap during the system information read period based on the SIB scheduling information and the upcoming page decode time by initiating a short sleep state to override the SIB scheduling information.

26. The multi-SIM wireless communication device of claim 15, wherein the processor is further configured to create the RF resource release gap during the system information read period based on the SIB scheduling information and the upcoming page decode time by masking SIBs that are broadcast from the first network, wherein masking SIBs mimics dormant SIB periods.

27. The multi-SIM wireless communication device of claim 26, wherein the dormant SIB periods comprise periods characterized by an absence SIBs scheduled to be decoded.

28. The multi-SIM wireless communication device of claim 16, wherein the processor is further configured to:
    identify an upcoming SIB decode timeout;
    determine whether the upcoming page decode time is scheduled to occur within a preset time threshold prior to the SIB decode timeout; and
    prevent creation of the RF resource release gap in response to determining that the upcoming page decode time is scheduled to occur within a preset time threshold prior to the SIB decode timeout.

29. A multi-subscriber identification module (SIM) wireless communication device, comprising:
    a radio frequency (RF) resource, wherein the RF resource is associated with at least a first SIM and a second SIM;
    means for receiving information about an upcoming page decode time for monitoring a paging channel associated with the second SIM, wherein the upcoming page decode time overlaps with a system information read period for the first SIM;
    means for retrieving system information block (SIB) scheduling information associated with the first SIM;
    means for creating a RF resource release gap during the system information read period based on the SIB scheduling information and the upcoming page decode time, wherein control of the RF resource is released by a modem stack associated with the first SIM; and
    means for providing control of the RF resource to a modem stack associated with the second SIM during the RF resource release gap.

30. A non-transitory processor-readable storage medium having stored thereon processor-executable instructions configured to cause a processor of a multi-subscriber identification module (SIM) wireless communication device having a first SIM, a second SIM and a shared radio frequency (RF) resource to perform operations comprising:
    receiving information about an upcoming page decode time for monitoring a paging channel associated with the second SIM, wherein the upcoming page decode time overlaps with a system information read period for the first SIM;
    retrieving system information block (SIB) scheduling information associated with the first SIM;
    creating a RF resource release gap during the system information read period based on the SIB scheduling information and the upcoming page decode time, wherein control of the RF resource is released by a modem stack associated with the first SIM; and
    providing control of the RF resource to a modem stack associated with the second SIM during the RF resource release gap.

* * * * *